United States Patent
Ji

(10) Patent No.: US 12,423,242 B2
(45) Date of Patent: Sep. 23, 2025

(54) APPARATUS AND METHOD FOR CACHE-COHERENCE

(71) Applicant: SAMSUNG ELECTRONICS CO., LTD., Suwon-si (KR)

(72) Inventor: Soo-Young Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 94 days.

(21) Appl. No.: 17/969,400

(22) Filed: Oct. 19, 2022

(65) Prior Publication Data
US 2023/0222067 A1    Jul. 13, 2023

(30) Foreign Application Priority Data

Jan. 7, 2022 (KR) .......... 10-2022-0003000
May 3, 2022 (KR) .......... 10-2022-0054903

(51) Int. Cl.
*G06F 12/08* (2016.01)
*G06F 12/0891* (2016.01)

(52) U.S. Cl.
CPC .... *G06F 12/0891* (2013.01); *G06F 2212/604* (2013.01)

(58) Field of Classification Search
CPC .......... G06F 12/0891; G06F 12/0862; G06F 12/1461; G06F 12/128; G06F 2212/604; G06F 2212/1021; G06F 13/0673; G06F 3/0622; G06F 3/0631; G06F 3/0679; G06F 9/5016; G06F 9/088; G06F 9/45558
See application file for complete search history.

(56) References Cited

U.S. PATENT DOCUMENTS

| | | | |
|---|---|---|---|
| 6,748,491 B2 | 6/2004 | Rodriguez | |
| 6,996,676 B2 | 2/2006 | Megiddo et al. | |
| 7,469,320 B2 | 12/2008 | Bonwick et al. | |
| 9,798,665 B1 * | 10/2017 | Yochai | G06F 12/0833 |
| 10,176,103 B1 | 1/2019 | Chatterjee et al. | |
| 10,387,330 B1 | 8/2019 | Colglazier | |
| 10,558,583 B1 | 2/2020 | Narasimhan et al. | |
| 11,886,354 B1 * | 1/2024 | Rohillah | G06F 12/0891 |
| 2002/0078300 A1 | 6/2002 | Dharap | |
| 2007/0061446 A1 * | 3/2007 | Matsuo | G06F 3/067 709/224 |
| 2012/0041914 A1 * | 2/2012 | Tirunagari | G06F 12/121 706/15 |

(Continued)

OTHER PUBLICATIONS

Extended European Search Report dated Jun. 12, 2023, issued by European Patent Office in European Patent Application No. 23150424.2.

*Primary Examiner* — Tracy C Chan
(74) *Attorney, Agent, or Firm* — Sughrue Mion, PLLC

(57) ABSTRACT

The present disclosure provides methods, apparatuses, and servers for cache-coherence. In some embodiments, an apparatus includes a plurality of compute express link (CXL) devices, and a switch. Each CXL device of the plurality of CXL devices includes a memory in which a portion of the memory is allocated as a cache buffer, to which different cache eviction policies are allocated. The different cache eviction policies are modified according to a cache hit ratio of the cache buffer. The switch is configured to connect the plurality of CXL devices to each other.

19 Claims, 11 Drawing Sheets

(56) References Cited

U.S. PATENT DOCUMENTS

| | | | |
|---|---|---|---|
| 2013/0151777 A1* | 6/2013 | Daly | G06F 12/0888 |
| | | | 711/E12.024 |
| 2020/0125495 A1 | 4/2020 | Galbi et al. | |
| 2020/0310984 A1* | 10/2020 | Choi | G06F 12/0246 |
| 2020/0327084 A1 | 10/2020 | Choudhary et al. | |
| 2021/0064531 A1* | 3/2021 | Bernat | G06F 12/0868 |
| 2021/0216456 A1* | 7/2021 | Flores | G06F 12/127 |
| 2021/0286730 A1 | 9/2021 | Lv et al. | |
| 2022/0188235 A1* | 6/2022 | Gupta | G06F 12/0848 |

* cited by examiner

FIG. 6

| DEVICE LIST | LATENCY | CACHE HIT RATIO | CACHE EVICTION POLICY |
|---|---|---|---|
| CXL DEVICE #1 | 1ms | - | LRU |
| ... | ... | - | ... |
| CXL DEVICE #50 | 33ms | - | LRU |
| CXL DEVICE #51 | 34ms | - | LFU |
| ... | ... | - | ... |
| CXL DEVICE #100 | 50ms | - | LFU |

FIG. 7

| DEVICE LIST | LATENCY | CACHE HIT RATIO | CACHE EVICTION POLICY |
|---|---|---|---|
| CXL DEVICE #1 | 1ms | 90% | LRU |
| ... | ... | - | ... |
| CXL DEVICE #50 | 33ms | 46% | LRU |
| CXL DEVICE #51 | 34ms | 42% | LFU |
| ... | ... | - | ... |
| CXL DEVICE #100 | 50ms | 39% | LFU → LRU |

FIG. 8

| DEVICE LIST | LATENCY | CACHE HIT RATIO | CACHE EVICTION POLICY |
|---|---|---|---|
| CXL DEVICE #1 | 1ms | 90% | LRU |
| ... | ... | - | ... |
| CXL DEVICE #50 | 33ms | 46% | LRU → LFU |
| CXL DEVICE #51 | 34ms | 42% | LFU |
| ... | ... | - | ... |
| CXL DEVICE #100 | 50ms | 39% | LFU |

APPARATUS AND METHOD FOR CACHE-COHERENCE

CROSS-REFERENCE TO RELATED APPLICATION

This application is based on and claims priority under 35 U.S.C. § 119 to Korean Patent Application No. 10-2022-0003000, filed on Jan. 7, 2022, and Korean Patent Application No. 10-2022-0054903, filed on May 3, 2022, in the Korean Intellectual Property Office, the disclosures of which are incorporated by reference herein in their entireties.

BACKGROUND

1. Field

The present disclosure relates to computing devices, and more particularly, to an apparatus and method for cache-coherence.

2. Description of the Related Art

Due to use of specialized workloads such as compression, encryption, and artificial intelligence, and a rapid increase of data, a demand for heterogeneous computing in which an accelerator developed for a special purpose works together with a general-purpose processor is increasing.

The accelerator may require a high performance connection to the processor, preferably sharing a memory space to reduce overhead and latency. For this reason, there is research on chip-to-chip interconnect protocols that maintain memory and cache-coherence by connecting the processor to various accelerators.

SUMMARY

According to an aspect of the present disclosure, an apparatus includes a plurality of compute express link (CXL) devices and a switch. Each CXL device of the plurality of CXL devices includes a memory in which a portion of the memory is allocated as a cache buffer, to which different cache eviction policies are allocated. The different cache eviction policies are modified according to a cache hit ratio of the cache buffer. The switch is configured to connect the plurality of CXL devices to each other.

The apparatus may further include a host connected to the plurality of CXL devices through the switch. The host may be configured to modify the different cache eviction policies of the cache buffer of each CXL device of the plurality of CXL devices.

The plurality of CXL devices may include first CXL devices and second CXL devices. The different cache eviction policies may include a first cache eviction policy allocated to the first CXL devices and a second cache eviction policy allocated to the second CXL devices. The host may be further configured to allocate, when a first ratio of a second cache hit ratio of the second CXL devices with respect to a first cache hit ratio of the first CXL devices exceeds a second ratio of a second quantity of the second CXL devices with respect to a first quantity of the first CXL devices, the second cache eviction policy to at least one CXL device of the first CXL devices.

The host may be further configured to compare the second ratio and the first ratio to obtain a comparison result, and determine, based on the comparison result, a third quantity of the at least one CXL device to which the second cache eviction policy is allocated.

The host may be further configured to select the at least one CXL device to which the second cache eviction policy is allocated according to an order of a lowest cache hit ratio from among the first CXL devices.

In some embodiments, the first cache eviction policy may be a least frequently used (LFU) eviction policy, and the second cache eviction policy may be a least recently used (LRU) eviction policy.

The host may be further configured to receive respective cache hit ratios of the plurality of CXL devices from a master CXL device of the plurality of CXL devices, and modify, according to the respective cache hit ratios, a cache eviction policy of the cache buffer of each CXL device of the plurality of CXL devices.

The host may be further configured to pre-allocate the cache eviction policy according to latencies of the plurality of CXL devices, before reception of the respective cache hit ratios.

The host may be further configured to respectively pre-allocate the different cache eviction policies to the plurality of CXL devices.

The host may be further configured to allocate a first cache eviction policy to a first CXL device with a first latency, and allocate a second cache eviction policy to a second CXL device with a second latency. The first latency may exceed the second latency.

The host may be further configured to allocate the first cache eviction policy and the second cache eviction policy according to a ratio of a second cache hit ratio of second CXL devices of the plurality of CXL devices to which the second cache eviction policy is allocated with respect to a first cache hit ratio of first CXL devices of the plurality of CXL devices to which the first cache eviction policy is allocated.

The host may be further configured to transmit an instruction to the plurality of CXL devices, and determine the latencies of the plurality of CXL devices based on respective times when a response corresponding to the instruction is received from each CXL device of the plurality of CXL devices.

The cache buffer may further include a plurality of cache buffer areas allocated to the host and the plurality of CXL devices.

A corresponding one of the different cache eviction policies may be allocated to each cache buffer area of the plurality of cache buffer areas.

The plurality of CXL devices comprises a master CXL device configured to modify a cache eviction policy of the cache buffer of the plurality of CXL devices.

According to an aspect of the present disclosure, a server includes a plurality of first devices including a cache buffer that includes a plurality of areas, and a second device. The second device is configured to allocate a corresponding cache eviction policy from among a plurality of cache eviction policies to each of one or more first areas allocated among the plurality of areas of the plurality of first devices, and modify the corresponding cache eviction policy allocated to each of the one or more first areas according to a cache hit ratio of each of the one or more first areas.

The second device is may be further configured to allocate the corresponding cache eviction policy to each of the one or more first areas, according to a latency of the plurality of first devices.

The plurality of first devices comprises a third device and a fourth device. The plurality of cache eviction policies comprise a first cache eviction policy allocated to a first area of the third device and a second cache eviction policy allocated to a second area of the fourth device. The second device may be further configured to allocate, when a first ratio of a second cache hit ratio of the fourth device with respect to a first cache hit ratio of the third device exceeds a second ratio of a second quantity of the plurality of first devices to which the second cache eviction policy is allocated with respect to a first quantity of the plurality of first devices to which the first cache eviction policy is allocated, the second cache eviction policy to at least one of the plurality of first devices to which the first cache eviction policy is allocated.

The second device may be further configured to select the at least one of the plurality of first devices according to an ascending order of a lowest cache hit ratio of the first area from among the plurality of first devices to which the first cache eviction policy is allocated.

According to an aspect of the present disclosure, a method performed by a computing system includes determining latencies of a plurality of CXL devices. The method further includes allocating a plurality of cache eviction policies to the plurality of CXL devices, according to the latencies of the plurality of CXL devices. The plurality of cache eviction policies include a first cache eviction policy and a second cache eviction policy. The plurality of CXL devices include first CXL devices to which the first cache eviction policy has been allocated and second CXL devices to which the second cache eviction policy has been allocated. The method further includes checking cache hit ratios of the plurality of CXL devices. The method further includes modifying a cache eviction policy of at least one of the plurality of CXL devices to at least one of the first cache eviction policy and the second cache eviction policy, based on first a ratio of a first cache hit ratio of the first CXL devices and a second cache hit ratio of the second CXL devices, and a second ratio of a first quantity of the first CXL devices and a second quantity of the second CXL devices.

BRIEF DESCRIPTION OF DRAWINGS

The above and other aspects, features, and advantages of certain embodiments of the present disclosure will be more apparent from the following description taken in conjunction with the accompanying drawings, in which:

FIG. 6 illustrates a table of a cache eviction policy allocated to CXL devices depending on a cache eviction policy allocation method, according to an embodiment;

FIGS. 7 and 8 illustrate tables of a cache eviction policy reallocated to CXL devices depending on a cache eviction policy allocation method, according to an embodiment;

DETAILED DESCRIPTION OF EMBODIMENTS

Figure 1:
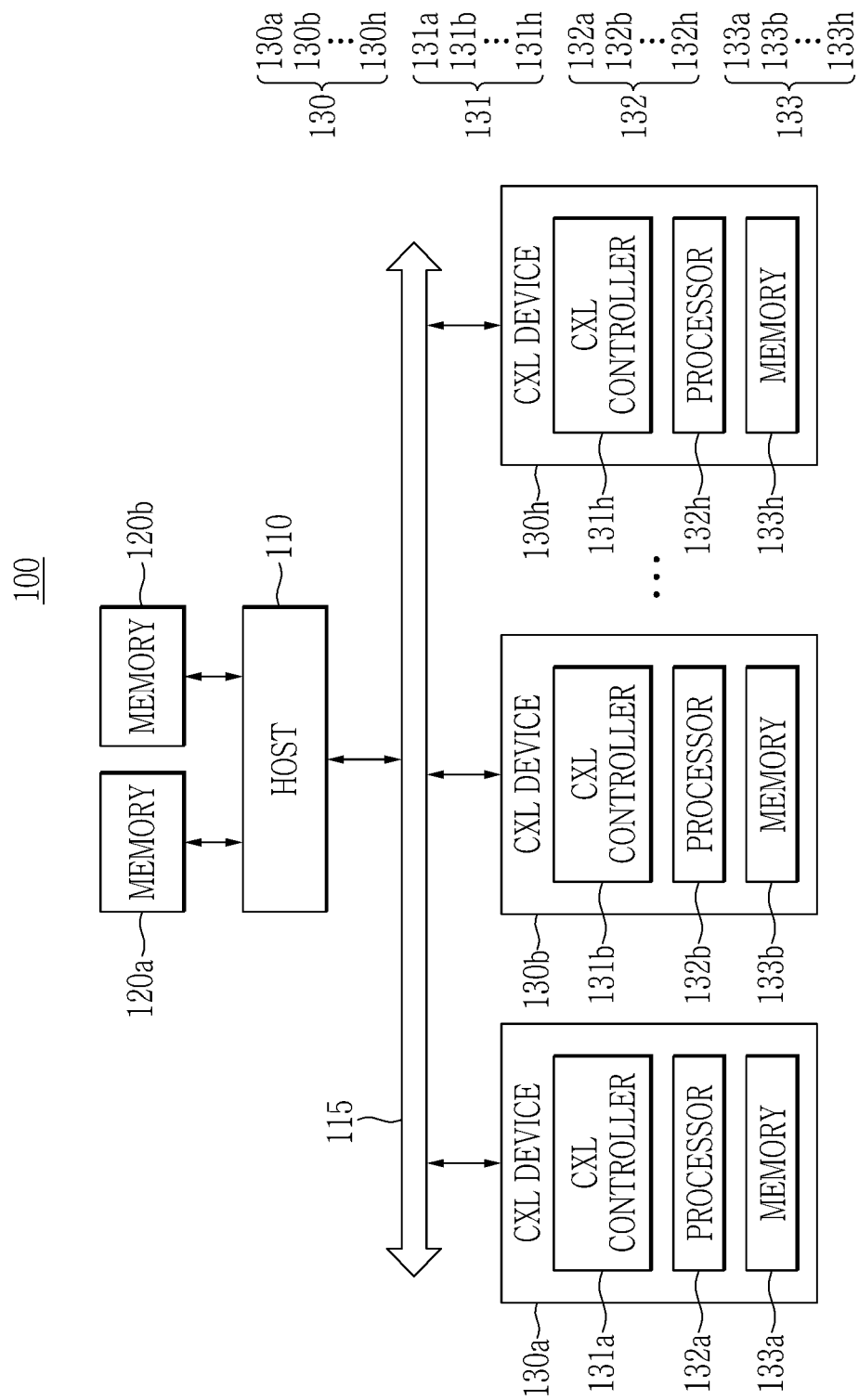
FIG. 1 illustrates a block diagram of a computer system, according to an embodiment.

The present invention will be described more fully hereinafter with reference to the accompanying drawings, in which embodiments are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 illustrates a block diagram of a computer system, according to an embodiment.

Referring to FIG. 1, a computer system 100 may include a host 110, a plurality of memories 120*a* and 120*b* (hereinafter, "120" generally), and at least one compute express link (CXL) device (130*a*, 130*b* . . . , 130*h*, where h is an integer greater than 1, hereinafter "130" generally). In some embodiments, the computer system 100 may be included in user devices such as, but not limited to, a personal computer, a laptop computer, a server, a media player, and a digital camera, and/or in automotive devices such as, but not limited to, a navigation device, a black box device, and an electric vehicle device. Alternatively or additionally, the computer system 100 may be a mobile system such as, but not limited to, a mobile phone, a smart phone, a tablet personal computer, a wearable device, a healthcare device, or an Internet of things (IoT) device.

The host 110 may control overall operations of the computer system 100. In some embodiments, the host 110 may be one of various processors such as, but not limited to, a central processing unit (CPU), a graphics processing unit (GPU), a neural processing unit (NPU), and a data processing unit (DPU). In some embodiments, the host 110 may include a single core processor and/or a multi-core processor.

In some embodiments, the CXL device 130 may operate as a cache buffer of the host 110. That is, the host 110 may use a memory (e.g., 133a, 133b, . . . , 133h, hereinafter "133" generally) of the CXL device 130 as a cache buffer.

In some embodiments, the host 110 may determine a cache eviction policy of the CXL device 130. In some embodiments, the host 110 may check latencies of the CXL devices 130, and allocate different cache eviction policies to the CXL devices 130 according to the latencies. In some embodiments, a CXL controller (e.g., 131a) of a CXL device (e.g., 130a) that may be designated as a master among the plurality of CXL devices 130 may collect cache hit ratios of the CXL devices 130 and may transmit the cache hit ratios to the host 110. The host 110 may reallocate different cache eviction policies to other CXL devices 130 according to the cache hit ratios.

The plurality of memory devices 120 may be used as a main memory and/or a system memory of the computer system 100. In some embodiments, each memory device of the plurality of memory devices 120 may be a dynamic random access memory (DRAM) device, and may have a form factor of a dual in-line memory module (DIMM). However, the scope of the present disclosure is not limited thereto, and the plurality of memory devices 120 may include a nonvolatile memory such as, but not limited to, a flash memory, a parameter random access memory (PRAM), a resistive random access memory (RRAM), and a magnetoresistive random access memory (MRAM).

The plurality of memory devices 120 may directly communicate with the host 110 through a double data rate (DDR) interface. In some embodiments, the host 110 may include a memory controller (not shown) configured to control the plurality of memory devices 120. However, the scope of the present disclosure is not limited thereto, and the plurality of memory devices 120 may communicate with the host 110 through various interfaces.

Each of the CXL devices 130 may include a CXL controller (e.g., 131a, 131b, . . . , 131h, hereinafter "131" generally), a processor (e.g., 132a, 132b, . . . , 132h, hereinafter "132" generally), and a memory 133. In some embodiments, each of the CXL devices 130 may operate as a cache buffer of the remaining CXL devices 130. For example, a first CXL device 130a may use the memories 133 of the CXL devices 130 as a cache buffer.

The CXL controller 131 may include an intellectual property (IP) circuit designed to implement an application specific integrated circuit (ASIC) and/or a field-programmable gate array (FPGA). In various embodiments, the CXL controller 131 may be implemented to support a CXL protocol (e.g., a CXL 2.0 protocol or another version thereof). The CXL controller 131 may convert signals of a CXL packet and of a memory interface of the memory 133 to each other.

In some embodiments, the CXL controller 131 may determine a cache eviction policy of the CXL device 130. In some embodiments, the CXL controller 131 of a CXL device 130 may check the latencies of the other (e.g., remaining) CXL devices 130, and may allocate different cache eviction policies to the other CXL devices according to the latencies. In some embodiments, the CXL controller 131 of a CXL device 130 may collect cache hit ratios of the other (e.g., remaining) CXL devices 130, and may allocate different cache eviction policies to the remaining CXL devices 130 according to the cache hit ratios.

The processor 132 may perform various operations performed by the CXL device 130, and may process data.

In some embodiments, each of the plurality of CXL devices 130 may be implemented as an individual memory device or memory module. Alternatively or additionally, the CXL device 130 may be connected to a cache-coherence interface 115 through different physical ports. That is, the plurality of CXL devices 130 are connected to the cache-coherence interface 115, so that a memory area managed by the host 110 may become high-capacity. For example, at least some (e.g., a portion) of the memories 133 of the plurality of CXL devices 130 may be managed as one memory cluster. In some embodiments, at least some of the memories 133 may be managed as at least one of a directly-attached memory cluster, a pooled memory cluster, a distributed memory cluster, and a disaggregated memory cluster.

The CXL device 130 may allocate at least a portion of an area of the memory 133 to another device (e.g., a host 110 or other CXL devices 130). For example, the host 110 may utilize the memories 133 of the CXL devices 130 as a memory resource of the host 110. Alternatively or additionally, the CXL device 130 may utilize the memories 133 of the CXL devices 130 as a memory resource of the CXL device 130.

The memory 133 may include one of a DRAM, a not-and (NAND) flash, a high bandwidth memory (HBM), a hybrid memory cube (HMC), a DIMM, an optane DIMM, a non-volatile DIMM (NVMDIMM), a double data rate synchronous DRAM (DDR SDRAM), and a low-power double data rate synchronous DRAM (LPDDR SDRAM), or a combination thereof.

In some embodiments, the host 110 and the CXL device 130 may be configured to share the same interface with each other. For example, the host 110 and the CXL device 130 may communicate with each other through the cache-coherence interface 115. The host 110 may access the memory 133 of the CXL device 130 through the cache-coherence interface 115, and the CXL device 130 may also access the plurality of memory devices 120 of the host 110 and/or the memory 133 of another CXL device 130 through the cache-coherence interface 115.

In some embodiments, the cache-coherence interface 115 may indicate a low-latency and a high-bandwidth link that may support coherency, memory access, and dynamic protocol multiplexing of an input/output (I/O) protocol to enable various connections between accelerators, memory devices, and/or various electronic devices. Hereinafter, for better understanding and ease of description, it is assumed that the host 110 and the CXL device 130 communicate with each other through the CXL interface 115. However, the cache-coherence interface 115 is not limited thereto, and the host 110 and the CXL device 130 may communicate with each other based on various computing interfaces such as, but not limited to, a GEN-Z protocol, an NVLink protocol, a cache coherent interconnect for accelerators (CCIX) protocol, and an open coherent accelerator processor interface (CAPI) protocol.

CXL refers to an open industry standard for communication based on peripheral component interconnect express (PCIe) 5.0, and may provide a fixed and relatively short packet size, and as a result, may provide a relatively high bandwidth and a relatively low fixed latency. As such, CXL may support cache-coherence, and may be well suited for realizing connection to a memory. CXL may be used in a server to provide the connection between the host 110 and the CXL device 130 (e.g., an accelerator, a memory device, and a network interface circuit (or a "network interface controller" or a network interface card (NIC))).

A cache-coherence protocol, such as CXL, may also be used for heterogeneous computing, such as, but not limited to, in scalar, vector, and buffered memory systems. CXL may be used to provide a cache-coherence interface by utilizing a channel, a retimer, a physical (PHY) layer of a system, a logical aspect of an interface, and a protocol from PCIe 5.0. A CXL transaction layer may include three multiplexed sub-protocols that simultaneously operate on a single link, which may be referred to as CXL.io, CXL.cache, and CXL.mem, respectively. The CXL.io protocol may include an I/O semantic that may be similar to PCIe. The CXL.cache protocol may include a caching semantic, and the CXL.mem protocol may include a memory semantic, and both the caching semantic and the memory semantic may be optional. Like the PCIe, the CXL may support (i) splittable x16, x8, and x4 base widths, (ii) data rates of 8 GT/s, 16 GT/s, and 32 GT/s capable of performance degradation to 128$b$/130$b$, (iii) 300 W (75 W at x16 connector), and (iv) plug and play. To support plug-and-play, the PCIe or CXL device link may start training on PCIe of Gen1, and it may also negotiate CXL, and may start a CXL transaction after completing Gen 1-5 training.

Figure 2:
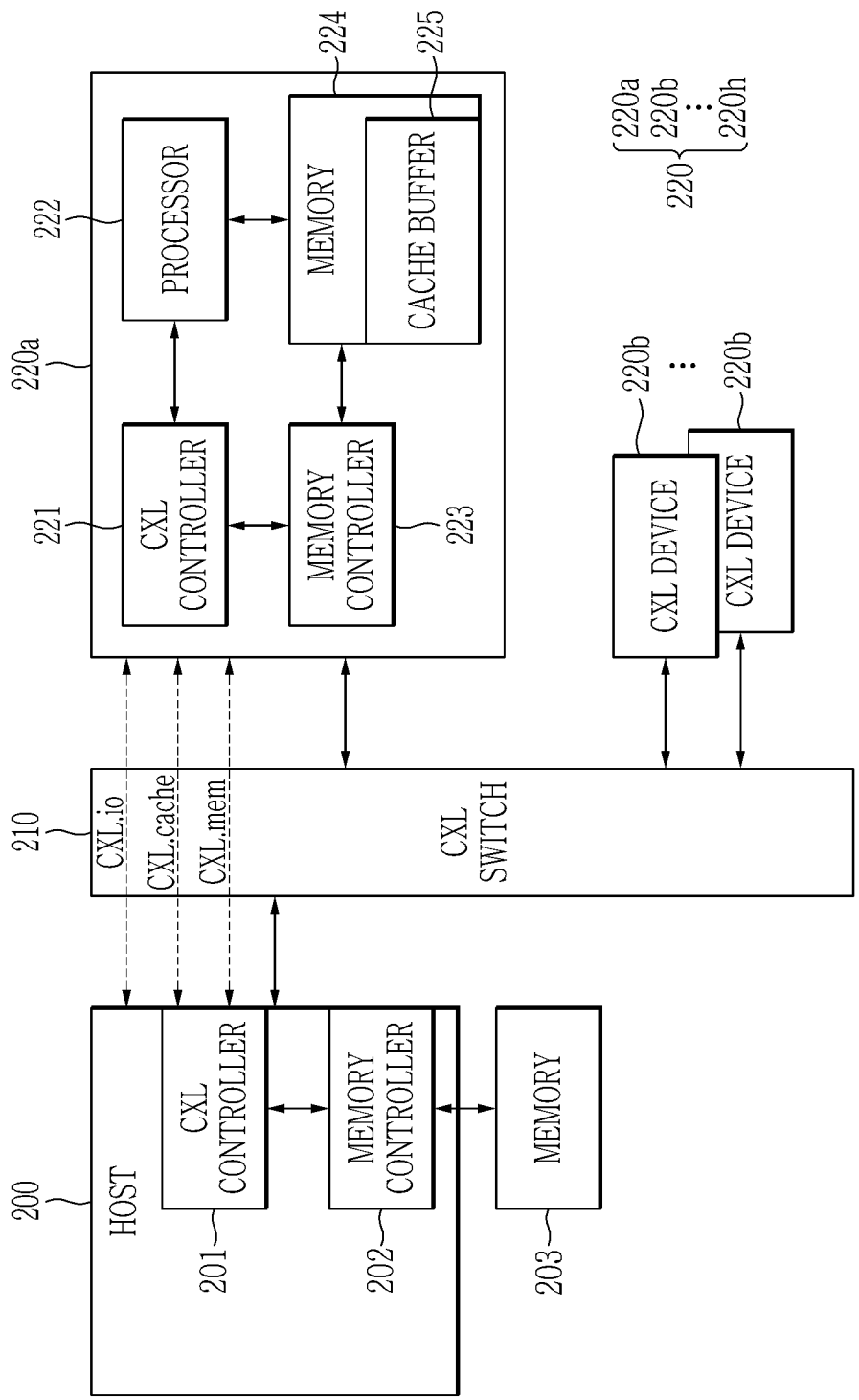
FIG. 2 illustrates a detailed block diagram of some constituent elements of a computer system, according to an embodiment.

FIG. 2 illustrates a detailed block diagram of some constituent elements of a computer system according to an embodiment.

Referring to FIG. 2, a host 200 and a plurality of CXL devices (220*a*, 220*b*, . . . , 220*h*, where h is an integer greater than 1, hereinafter "220" generally) may communicate with each other through a CXL switch 210. The host 200 may include or may be similar in many respects to the host 100 of FIG. 1, and may include additional features not mentioned above. The CXL devices 220 may include or may be similar in many respects to the CXL devices 130 of FIG. 2, and may include additional features not mentioned above.

The CXL switch 210 may be a configuration included in a CXL interface. The CXL switch 210 may be configured to mediate communication between the host 200 and the CXL device 220. For example, when the host 200 and the CXL device 220 communicate with each other, the CXL switch 210 may be configured to transmit information such as, but not limited to, a request, data, response, or signal transmitted from the host 200 or the CXL device 220 to the CXL device 220 or the host 200. When the CXL devices 220 communicate with each other, the CXL switch 210 may be configured to transmit information such as, but not limited to, a request, data, response, or signal between the CXL devices 220.

The host 200 may include a CXL controller 201. The CXL controller 201 may communicate with the CXL device 220 through the CXL switch 210. The CXL controller 201 may be coupled to a memory controller 202 and a memory 203 associated therewith.

The CXL switch 210 may be used to implement a memory cluster through one-to-many and many-to-one switching between the CXL devices 220 connected to each other (e.g., the CXL switch 210 may connect (i) a plurality of root ports to one endpoint, (ii) one root port to a plurality of endpoints, or (iii) a plurality of root ports to a plurality of endpoints).

In addition to providing a packet-switching function for CXL packets, the CXL switch 210 may be used to connect the CXL devices 220 to one or more hosts 200. The CXL switch 210 allows the CXL devices 220 to include various types of memories with different characteristics, virtualizes the memories of the CXL devices 220, enables data of different characteristics (e.g., access frequency) to be stored in an appropriate type of memory, and supports remote direct memory access (RDMA). Here, "virtualizing" the memory may refer to performing memory address translation between the processing circuit and the memory.

The CXL device 220 may include a CXL controller (e.g., 221*a*, 221*b*, . . . , 221*h*, hereinafter "221" generally), a processor (e.g., 222*a*, 222*b*, . . . , 222*h*, hereinafter "222" generally), a memory controller (e.g., 223*a*, 223*b*, . . . , 223*h*, hereinafter "223" generally), and a memory (e.g., 224*a*, 224*b*, . . . , 224*h*, hereinafter "224" generally). Other CXL devices 220 may also include the same or similar constituent elements to a first CXL device 220*a*. The CXL controller 221, the processor 222, and the memory 224 may include or may be similar in many respects to the CXL controller 131, the processor 132, and the memory 133 of FIG. 1, respectively, and may include additional features not mentioned above.

The CXL controller 221 may be connected to the CXL switch 210. The CXL controller 221 may communicate with the host 200 and/or other CXL devices through the CXL switch 210. The CXL controller 221 may include a PCIe 5.0 (or other version) architecture for the CXL.io path, and may add CXL.cache and CXL.mem paths specific to CXL. In some embodiments, the CXL controller 221 may be configured to be backward compatible with an older cache-coherence protocol, such as CXL 1.1. The CXL controller 221 may be configured to implement the CXL.io, CXL.mem, and CXL.cache protocols or another suitable cache-coherence protocol. The CXL controller 221 may be configured to support different types of CXL devices, such as type 1, type 2, and/or type 3 of CXL devices. The CXL controller 221 may be configured to support a PCIe protocol, such as a PCIe 5.0 protocol. The CXL controller 221 may be configured to support the PIPE 5.x protocol by using any suitable PIPE interface width (e.g., 8-, 16-, 32-, 64-, and 128-bit configurable PIPE interface widths). The CXL controller 221 may be configured to support various CXL device configurations such as those shown and described in reference to FIG. 2.

The processor 222 may be configured to control overall operations of the CXL device 220. The processor 222 may perform an operation on data stored in the memory 224. The processor 222 may perform filtering on data stored in the memory 224.

The memory controller 223 may control the memory 224 so that data may be stored in the memory 224 and/or data may be read from the memory 224. In some embodiments, the memory controller 223 may be implemented to comply with a standard protocol such as, but not limited to, a DDR interface, an LPDDR interface, or the like. The memory 224 may store data and/or output stored data according to control of the memory controller 223.

The memory controller 223 may be configured to manage the memory 224. In some embodiments, the memory controller 223 may allocate some areas of the memory 224 to a cache buffer 225. The memory controller 223 may allocate the cache buffer 225 to other devices (e.g., the host 200 or other CXL devices 220).

In some embodiments, at least some of the areas of the memory 224 of the CXL device 220 may be allocated as a dedicated area for the CXL device 220, and the remaining areas thereof may be used as an area accessible by the host 200 or other CXL devices 220.

In some embodiments, the memory controller 223 may select a data block to be discarded among data cached in the cache buffer 225 according to the cache eviction policy allocated to the cache buffer 225. As the cache eviction policy, a least recently used (LRU) eviction policy, a least frequently used (LFU) eviction policy, a re-reference interval prediction (RRIP) eviction policy, and the like may be used, and hereinafter, it is assumed and described that the LRU eviction policy and the LFU eviction policy are used. However, in addition to the LRU eviction policy, another cache eviction policy for replacing the cache according to recency may be used, and other cache eviction policies for replacing the cache according to frequency in addition to the LFU eviction policy may be used. This is described with reference to FIG. 3.

Figure 3:
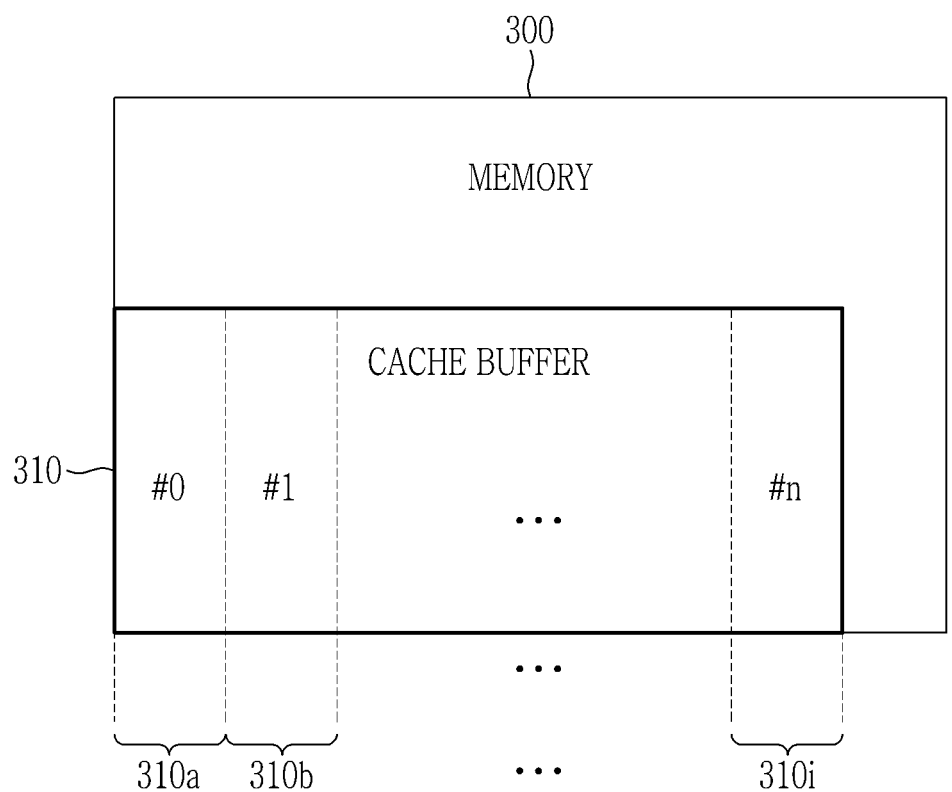
FIG. 3 illustrates a memory of a compute express link (CXL) device, according to an embodiment.

FIG. 3 illustrates a memory of a CXL device according to an embodiment.

Referring to FIG. 3, a memory 300 may allocate some areas of the memory as a cache buffer 310. The memory 300 and the cache buffer 310 may include or may be similar in many respects to the memory 224 and the cache buffer 225 of FIG. 2, respectively, and may include additional features not mentioned above.

Alternatively or additionally, the cache buffer 310 may be divided into a plurality of areas 310a, 310b, . . . , 310i (where i is an integer greater than 1, hereinafter "310" generally). The plurality of areas 310 may be allocated to devices (e.g., the host 200 and the CXL devices 220), respectively. For example, a first area 310a may be allocated to the host 200, and the areas 310b, . . . , 310i may be respectively allocated to the CXL devices 220a, . . . , 220h.

Each of the plurality of areas 310 may operate according to a corresponding cache eviction policy. For example, the LRU eviction policy may be allocated to the first area 310a, and the LFU eviction policy may be allocated to the area i-th 310i.

Referring back to FIG. 2, the memory controller 223 may select a data block to be discarded among data cached in each of a plurality of areas of the cache buffer 225 (or cache buffer 310 of FIG. 3) according to a cache eviction policy allocated to each of the plurality of areas of the cache buffer 225 (or cache buffer 310 of FIG. 3).

In some embodiments, the host 200 and the CXL device 220 may communicate with each other by using the CXL.io protocol, which is an I/O protocol. The CXL.io protocol may have a PCIe-based non-consistence input and output protocol. The host 200 and the CXL device 220 may exchange user data and/or various information with each other by using the CXL.io protocol.

In some embodiments, the host 200 and the CXL device 220 may communicate with each other by using CXL.cache protocol, which is a memory access protocol. The CXL device 220 may use the CXL.cache protocol to access some areas of the memory 203 of the host 200, for example.

In some embodiments, the host 200 and the CXL device 220 may communicate with each other by using CXL.mem protocol, which is a memory access protocol. The host 200 may access some areas of the memory 224 of the CXL device 220 by using the CXL.mem protocol.

The above-described access types (e.g., the CXL.io, the CXL.cache, and the CXL.mem) are some examples, and the scope of the present invention is not limited thereto.

In some embodiments, the CXL device 220 may be mounted on a physical port (e.g., a PCIe physical port) based on a CXL interface. In some embodiments, the CXL device 220 may be implemented based on E1.S, E1.L, E3.S, E3.L, PCIe Add-in-Card (AIC) (e.g., Card Electromechanical (CEM)) form factors. Alternatively, the CXL device 220 may be implemented based on a U.2 form factor, an M.2 form factor, or other various types of PCIe-based form factors, or other various types of small form factors. The CXL device 220 may be implemented in various form factors, and may support a hot-plug function that may be mounted or removed from a physical port.

Figure 4:
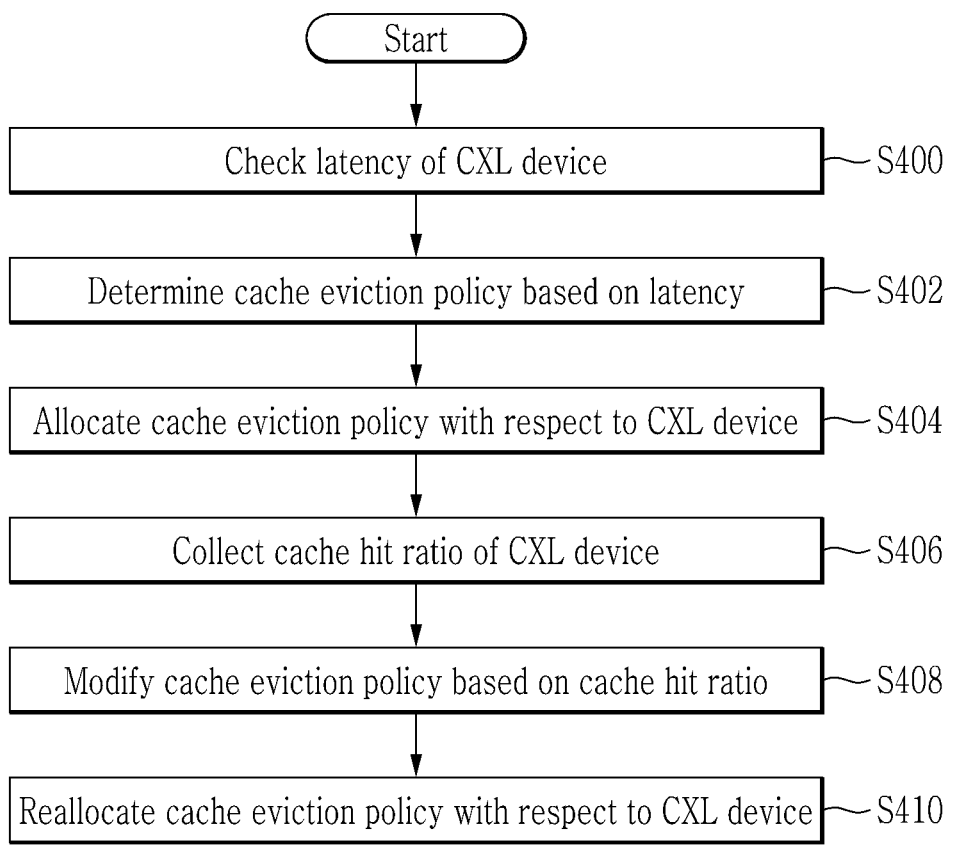
FIG. 4 illustrates a flowchart of a cache eviction policy allocation method, according to an embodiment.

FIG. 4 illustrates a flowchart of a cache eviction policy allocation method according to an embodiment.

A cache eviction policy allocation method is described with reference to FIGS. 2 and 4. Hereinafter, the host 200 is described as a subject of operation.

The CXL controller 201 of the host 200 checks latencies of the CXL devices 220 (S400). For example, the CXL controller 201 may provide a read instruction to each of the CXL devices 220 through the CXL switch 210, and may uses a time interval until data outputted from each of the CXL devices 220 is received by the CXL controller 201 through the CXL switch 210 in response to the read instruction, so that a latency of each of the CXL devices 220 may be determined. Alternatively or additionally, the CXL controller 201 may provide a write instruction to each of the CXL devices 220 through the CXL switch 210, and may use a time interval until a response outputted from each of the CXL devices 220 is received by the CXL controller 201 through the CXL switch 210 in response to the write instruction, so that the latency of each of the CXL devices 220 may be determined.

The CXL controller 201 of the host 200 determines a cache eviction policy based on the checked latency (S402). In some embodiments, the CXL controller 201 may determine a cache eviction policy for each of the CXL devices 220 based on the latency of each of the CXL devices 220. For example, the CXL controller 201 may determine a cache eviction policy of the CXL devices 220 having a relatively low latency among the CXL devices 220 as the LRU eviction policy. The CXL controller 201 may allocate a cache eviction policy of the CXL devices 220 having a relatively high latency among the CXL devices 220 as the LFU eviction policy. A ratio of the CXL devices 220 to which the LRU eviction policy is allocated and the CXL devices 220 to which the LFU eviction policy is allocated may be preset.

The CXL controller 201 of the host 200 allocates the determined cache eviction policy to the CXL devices 220 (S404).

The CXL controller 201 of the host 200 collects the cache hit ratios of the CXL devices 220 through the CXL device 220a (S406). For example, the CXL controller 221 of a first CXL device 220a that is designated as a master may collect the cache hit ratio from step S404 of allocating the cache eviction policy. The CXL controller 221 of the first CXL device 220a may collect the cache hit ratio for the area allocated to the host 200 from among the cache buffers 225 of the CXL devices 220. The CXL controller 201 of the host 200 may query the first CXL device 220*a* for the cache hit ratio. Then, the CXL controller 221 of the first CXL device 220*a* may transmit information on the cache hit ratios of the CXL devices 220 to the CXL controller 201 of the host 200.

The CXL controller 201 of the host 200 modifies the cache eviction policy based on the collected cache hit ratio (S408). In some embodiments, the CXL controller 201 may modify the cache eviction policy of the CXL devices 220 depending on the ratio of the cache hit ratio according to each cache eviction policy. For example, when the ratio of the cache hit ratio of the CXL device to which the LRU eviction policy is allocated and the cache hit ratio of the CXL device to which the LFU eviction policy is allocated is different from the ratio, determined in step S404, of the CXL devices 220 to which the LRU eviction policy is allocated and the CXL devices 220 to which the LFU eviction policy is allocated, the CXL controller 201 of the host 200 may modify the cache eviction policy of the CXL devices 220.

In some embodiments, according to the ratio of the cache hit ratio of the CXL device 220 to which the LRU eviction policy is allocated and the cache hit ratio of the CXL device 220 to which the LFU eviction policy is allocated, the CXL controller 201 may modify the ratio of the CXL devices 220 to which the LRU eviction policy is allocated and the CXL devices 220 to which the LFU eviction policy is allocated.

In some embodiments, the CXL controller 201 may modify the cache eviction policy of the CXL device 220 having a relatively low cache hit ratio among the CXL devices 220 to which the LRU eviction policy is allocated to the LFU eviction policy.

In some embodiments, the CXL controller 201 may modify the cache eviction policy of the CXL device 220 having a relatively low cache hit ratio among the CXL devices 220 to which the LFU eviction policy is allocated to the LRU eviction policy.

The CXL controller 201 of the host 200 reallocates the modified cache eviction policy to the CXL devices 220 (S410).

According to the cache eviction policy allocation method as described above, since the cache eviction policy is modified according to the tendency of data stored and processed in the CXL device 220, the cache hit ratio of the CXL device 220 may be increased. Accordingly, data latency for the CXL device 220 of the host 200 may be reduced.

Figure 5:
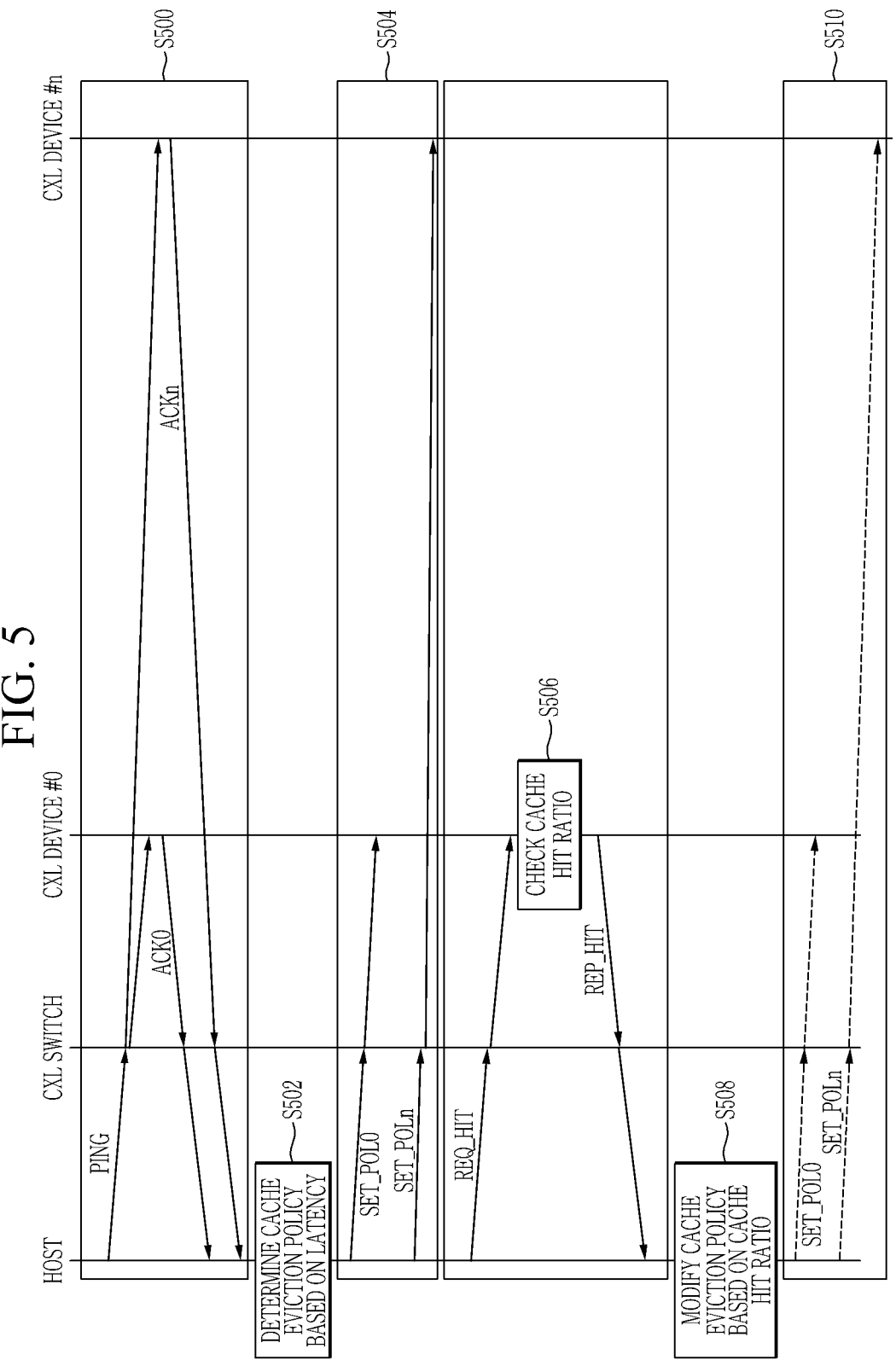
FIG. 5 illustrates a flowchart of a cache eviction policy allocation method between a host and CXL devices, according to an embodiment.

FIG. 5 illustrates a flowchart of a cache eviction policy allocation method between a host and CXL devices according to an embodiment.

FIG. 5 illustrates a case in which a host (e.g., HOST) uses the CXL devices (e.g., CXL DEVICE #0, . . . , #n) as a cache buffer. Referring to FIG. 5, in step S500, the host (HOST) may check latency of the CXL devices (CXL DEVICE #0, . . . , #n). The host (HOST) may transmit an instruction (e.g., PING) for latency check to a CXL switch (e.g., CXL SWITCH), and the CXL switch (CXL SWITCH) may transmit the instruction (PING) to the CXL devices (CXL DEVICE #0, . . . , #n). The instruction (PING) may be a read instruction for memories of the CXL devices (CXL DEVICE #0, . . . , #n). The CXL devices (CXL DEVICE #0, . . . , #n) may transmit responses (ACK0, . . . , ACKn) with respect to the read instruction (PING) to the CXL switch (CXL SWITCH), and the CXL switch (CXL SWITCH) may transmit the responses (e.g., ACK0, . . . , ACKn) of the CXL devices (CXL DEVICE #0, . . . , #n) to the host.

In some embodiments, a time it takes (e.g., elapsed) for the host (HOST) to transmit the instruction (PING) and to receive each of the responses (ACK0, . . . , ACKn) with respect to the transmitted instruction (PING) may be determined as latency of each of the CXL devices (CXL DEVICE #0, . . . , #n). In another embodiment, the CXL switch (CXL SWITCH) may transmit the instruction (PING) to the CXL devices (CXL DEVICE #0, . . . , #n), may determine a time it takes to receive each of the responses (ACK0, . . . , ACKn) with respect to the transmitted instruction (PING) as latency of each of the CXL devices (CXL DEVICE #0, . . . , #n), and may provide information about the latency of each of the CXL devices (CXL DEVICE #0, . . . , #n) to the host (HOST).

In step S502, the host (HOST) may determine the cache eviction policy based on the latency of each of the CXL devices (CXL DEVICE #0, . . . , #n). In step S502, the ratio of the CXL devices to which the LRU eviction policy is allocated and the ratio of the CXL devices to which the LFU eviction policy is allocated may be the same. Step S502 is described in further detail in reference to FIG. 6.

FIG. 6 illustrates a table of a cache eviction policy allocated to CXL devices depending on a cache eviction policy allocation method according to an embodiment.

Referring to FIG. 6, 100 CXL devices are listed according to latencies of respective CXL devices. For 50 CXL devices (e.g., CXL DEVICE #1, . . . , #50) having relatively low latency, an LRU eviction policy may be determined as a cache eviction policy. For the 50 CXL devices (e.g., CXL DEVICE #51, . . . , #100) having relatively high latency, an LFU eviction policy may be determined as a cache eviction policy.

Referring back to FIG. 5, in step S504, the host (HOST) may transmit the instruction (e.g., SET_POL0, . . . , SET_POLn) to the CXL devices (CXL DEVICE #0, . . . , #n) to modify the cache eviction policy to the cache eviction policy determined for each of the CXL devices (CXL DEVICE #0, . . . , #n). Then, the memory controller of the CXL devices (CXL DEVICE #0, . . . , #n) may control the cache according to the modified cache eviction policy.

In step S506, the host (HOST) may check the cache hit ratio of the CXL devices (CXL DEVICE #0, . . . , #n). The host (HOST) may transmit an instruction (e.g., REQ_HIT) to check the cache hit ratio to the CXL switch (CXL SWITCH), and the CXL switch (CXL SWITCH) may transmit the instruction (REQ_HIT) to the master CXL device (e.g., CXL DEVICE #0). The master CXL device (CXL DEVICE #0) may check the cache hit ratio of the CXL devices (CXL DEVICE #0, . . . , #n), and may transmit the cache heat of the CXL devices (CXL DEVICE #0, . . . , #n) to the CXL Switch (CXL SWITCH) as a response to the instruction (REP_HIT). The master CXL device (CXL DEVICE #0) may check the cache hit ratio of the area allocated to the host among the cache buffers of the CXL devices (CXL DEVICE #0, . . . , #n). The CXL switch (CXL SWITCH) may transmit a response (REP_HIT) of each of the CXL devices (CXL DEVICE #0, . . . , #n) to the host.

In step S508, the host (HOST) may modify the cache eviction policy based on the cache hit ratio of the CXL devices (CXL DEVICE #0, . . . , #n). The host (HOST) may transmit the instruction (SET_POL0, . . . , SET_POLn) to the CXL devices (CXL DEVICE #0, . . . , #n) to modify the cache eviction policy to the cache eviction policy determined for each of the CXL devices (CXL DEVICE #0, . . . , #n). Then, the memory controller of the CXL devices (CXL DEVICE #0, . . . , #n) may control the cache according to the modified cache eviction policy. Step S508 is described with reference to FIGS. 7 and 8.

FIGS. 7 and 8 illustrate tables of a cache eviction policy reallocated to CXL devices depending on a cache eviction policy allocation method according to an embodiment.

The host (HOST) may modify the ratio of the CXL devices to which the LRU eviction policy is allocated and the CXL devices to which the LFU eviction policy is allocated, according to the ratio of the cache hit ratio of the CXL devices (e.g., CXL DEVICE #1, . . . , #50) to which the LRU eviction policy is allocated and the cache hit ratio of the CXL devices (e.g., CXL DEVICE #51, . . . , #100) to which the LFU eviction policy is allocated.

For example, in step S504 of FIG. 5, the LRU eviction policy and the LFU eviction policy are allocated to 100 CXL devices (e.g., CXL DEVICE #1, . . . , #100) at the same ratio. After that, when an average cache hit ratio of the CXL devices (CXL DEVICE #1, . . . , #50) to which the LRU eviction policy is allocated is 75% and an average cache hit ratio of the CXL devices (CXL DEVICE #51, . . . , #100) to which the LFU eviction policy is allocated is 50%, a cache hit ratio for each cache eviction policy may be calculated as 6:4, for example. Accordingly, the host (HOST) may allocate the LRU eviction policy to more CXL devices according to the cache hit ratio for each cache eviction policy. For example, the host (HOST) may allocate the LRU eviction policy by selecting 10 CXL devices from among the 50 CXL devices to which the LFU eviction policy has been allocated.

The host (HOST) may modify the cache eviction policy of the CXL device to the LRU eviction policy in the order of the lowest cache hit ratio among the CXL devices (e.g., CXL DEVICE #51, . . . , #100) to which the LFU eviction policy is allocated. For example, the host (HOST) may modify the cache eviction policy of 10 CXL devices to the LRU eviction policy in the order of the lowest cache hit ratio among the CXL devices (CXL DEVICE #51, . . . , #100) to which the LFU eviction policy is allocated. Referring to FIG. 7, the cache eviction policy of the CXL device (CXL DEVICE #100) is modified from the LFU eviction policy to the LRU eviction policy.

As another example, after step S504, when an average cache hit ratio of the CXL devices (CXL DEVICE #1, . . . , #50) to which the LRU eviction policy is allocated may be 50% and an average cache hit ratio of the CXL devices (CXL DEVICE #51, . . . , #100) to which the LFU eviction policy is allocated may be 75%, a cache hit ratio for each cache eviction policy may be calculated as 4:6. Accordingly, the host (HOST) may allocate the LFU eviction policy to more CXL devices according to the cache hit ratio for each cache eviction policy. That is, the host (HOST) may allocate the LFU eviction policy by selecting 10 CXL devices from among the 50 CXL devices to which the LRU eviction policy has been allocated.

In some embodiments, the host (HOST) may modify the cache eviction policy of the CXL device to the LFU eviction policy in the order of the lowest cache hit ratio among the CXL devices (CXL DEVICE #1, . . . , #50) to which the LRU eviction policy is allocated. For example, the host (HOST) may modify the cache eviction policy of 10 CXL devices to the LFU eviction policy in the order of the lowest cache hit ratio among the CXL devices (CXL DEVICE #1, . . . , #50) to which the LRU eviction policy is allocated. Referring to FIG. 8, the cache eviction policy of the CXL device (CXL DEVICE #50) is modified from the LRU eviction policy to the LFU eviction policy.

Figure 9:
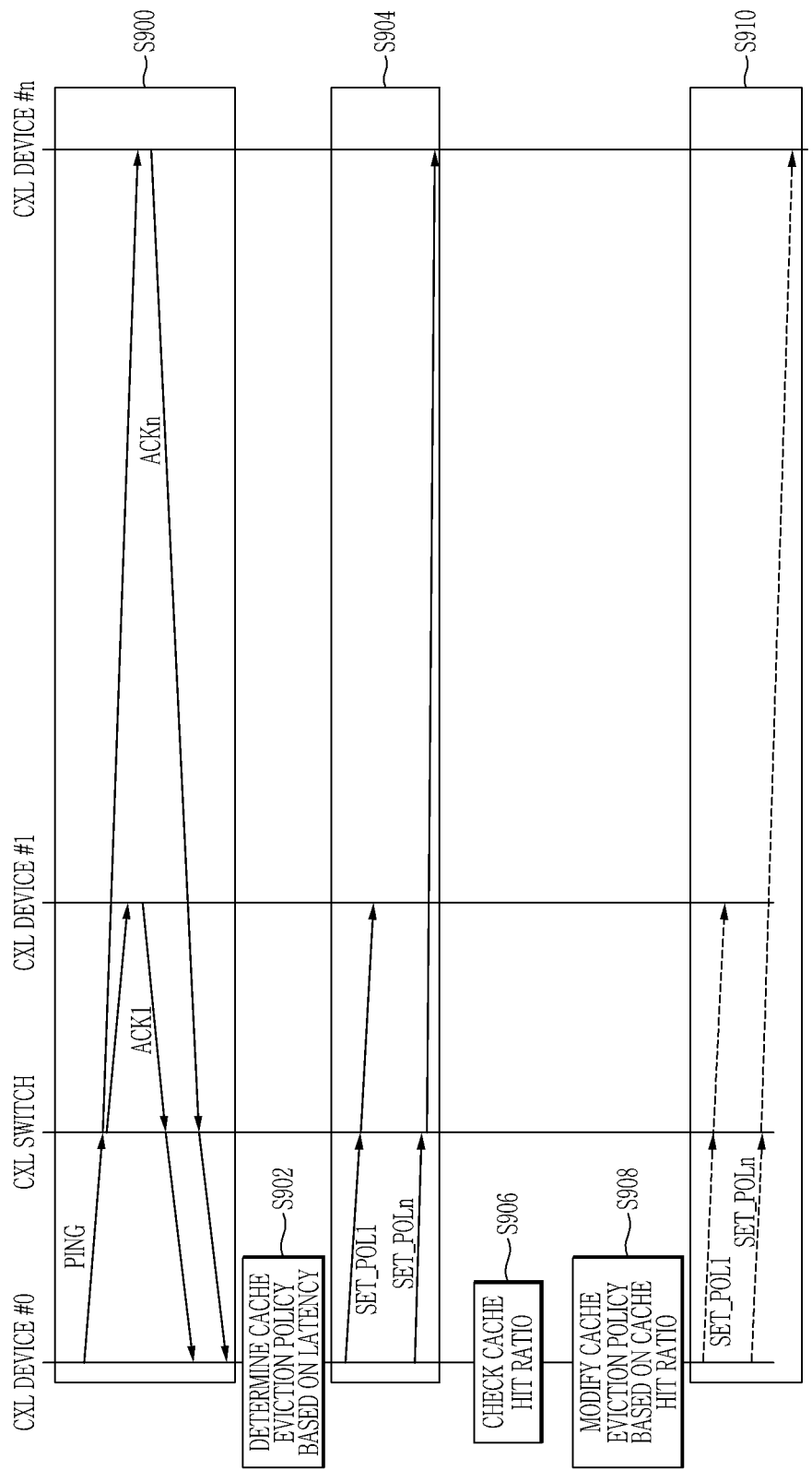
FIG. 9 illustrates a flowchart of a cache eviction policy allocation method between CXL devices, according to an embodiment.

FIG. 9 illustrates a flowchart of a cache eviction policy allocation method between CXL devices according to an embodiment.

Referring to FIG. 9, it illustrates a case in which a first CXL device (e.g., CXL DEVICE #0) uses other CXL devices (e.g., CXL DEVICE #1, . . . , #n) as a cache buffer. Hereinafter, the first CXL device (CXL DEVICE #0) is described as a subject of operation, but the following method may be performed by each of other CXL devices (e.g., CXL DEVICE #1, . . . , #n).

In step S900, the first CXL device (CXL DEVICE #0) may check latencies of other CXL devices (CXL DEVICE #1, . . . , #n). The first CXL device (CXL DEVICE #0) may transmit an instruction (e.g., PING) for latency check to a CXL switch (e.g., CXL SWITCH), and the CXL switch (e.g., CXL SWITCH) may transmit the instruction (PING) to other CXL devices (CXL DEVICE #1, . . . , #n). The instruction (PING) may be a read instruction for memories of other CXL devices (CXL DEVICE #1, . . . , #n). Other CXL devices (CXL DEVICE #1, . . . , #n) may transmit responses (e.g., ACK1, . . . , ACKn) with respect to the read instruction (PING) to the CXL switch (CXL SWITCH), and the CXL switch (CXL SWITCH) may transmit the responses (ACK1, . . . , ACKn) of other CXL devices (CXL DEVICE #1, . . . , #n) to the CXL device (CXL DEVICE #0).

In some embodiments, a time it takes for the CXL device (CXL DEVICE #0) to transmit the instruction (PING) and to receive each of the responses (ACK1, . . . , ACKn) with respect to the transmitted instruction (PING) may be determined as latency of each of other CXL devices (CXL DEVICE #1, . . . , #n). In another embodiment, the CXL switch (CXL SWITCH) may transmit the instruction (PING) to other CXL devices (CXL DEVICE #1, . . . , #n), may determine a time it takes to receive each of the responses (ACK1, . . . , ACKn) with respect to the transmitted instruction (PING) as latency of each of other CXL devices (CXL DEVICE #1, . . . , #n), and may provide information about the latency of each of other CXL devices (CXL DEVICE #1, . . . , #n) to the first CXL device (CXL DEVICE #0).

In step S902, the first CXL device (CXL DEVICE #0) may determine the cache eviction policy based on the latency of each of other CXL devices (CXL DEVICE #1, . . . , #n). In step S902, the ratio of the CXL devices to which the LRU eviction policy is allocated and the ratio of the CXL devices to which the LFU eviction policy is allocated may be the same.

In step S904, the first CXL device (CXL DEVICE #0) may transmit the instruction (e.g., SET_POL1, . . . , SET_POLn) to other CXL devices (CXL DEVICE #1, . . . , #n) to modify the cache eviction policy to the cache eviction policy determined for each of other CXL devices (CXL DEVICE #1, . . . , #n). Then, the memory controller of other CXL devices (CXL DEVICE #1, . . . , #n) may control the cache according to the modified cache eviction policy.

In step S906, the first CXL device (CXL DEVICE #0) may check the cache hit ratios of other CXL devices (CXL DEVICE #1, . . . , #n). The first CXL device (CXL DEVICE #0) may check the cache hit ratio of the area allocated to the CXL device (CXL DEVICE #0) among the cache buffers of the CXL devices (CXL DEVICE #1, . . . , #n).

In step S908, the first CXL device (CXL DEVICE #0) may modify the cache eviction policy based on the cache hit ratios of other CXL devices (CXL DEVICE #1, . . . , #n). The first CXL device (CXL DEVICE #0) may transmit the instruction (SET_POL1, . . . , SET_POLn) to the CXL devices (CXL DEVICE #1, . . . , #n) to modify the cache eviction policy to the cache eviction policy determined for each of other CXL devices (CXL DEVICE #1, . . . , #n). Then, the memory controller of the CXL devices (CXL DEVICE #1, . . . , #n) may control the cache according to the modified cache eviction policy. The description related to step S908 has been described with reference to FIG. 7 and FIG. 8 above.

Figure 10:
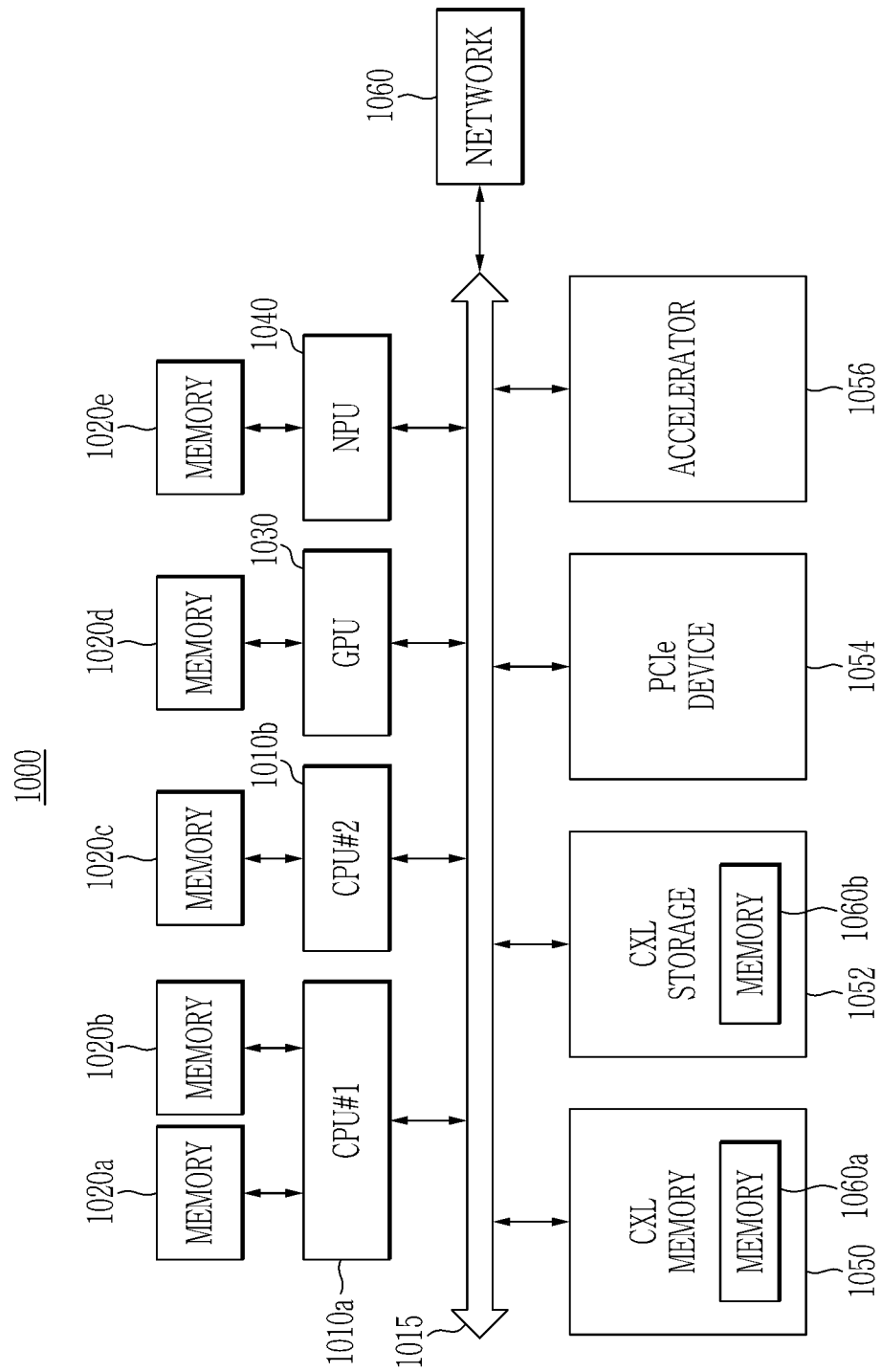
FIG. 10 illustrates a block diagram of a computer system, according to an embodiment.

FIG. 10 illustrates a block diagram of a computer system according to another embodiment.

Referring to FIG. 10, a computer system 1000 may include a first CPU 1010a, a second CPU 1010b, a GPU 1030, an NPU 1040, a CXL switch 1015, a CXL memory 1050, a CXL storage 1052, a PCIe device 1054, and an accelerator (e.g., CXL device) 1056.

The first CPU 1010a, the second CPU 1010b, the GPU 1030, the NPU 1040, the CXL memory 1050, the CXL storage 1052, the PCIe device 1054, and the accelerator 1056 may be commonly connected to the CXL switch 1015. Alternatively or additionally, the first CPU 1010a, the second CPU 1010b, the GPU 1030, the NPU 1040, the CXL memory 1050, the CXL storage 1052, the PCIe device 1054, and the accelerator 1056 may communicate with each other through the CXL switch 1015.

In some embodiments, each of the first CPU 1010a, the second CPU 1010b, the GPU 1030, and the NPU 1040 may be the host described with reference to FIG. 1 to FIG. 9, and they may be directly connected to individual memories 1020a, 1020b, 1020c, 1020d, and 1020e, respectively.

In some embodiments, the CXL memory 1050 and the CXL storage 1052 may be the CXL device described with reference to FIG. 1 to FIG. 9, and by one or more of the first CPU 1010a, the second CPU 1010b, the GPU 1030, and the NPU 1040, at least some areas of the CXL memory 1050 and the memories 1060a and 1060b of the CXL storage 1052 may be allocated as a cache buffer of at least one of the first CPU 1010a, the second CPU 1010b, the GPU 1030, the NPU 1040, the CXL memory 1050, the CXL storage 1052, the PCIe device 1054, and the accelerator 1056.

In some embodiments, the CXL switch 1015 may be connected to the PCIe device 1054 or the accelerator 1056 configured to support various functions, and the PCIe device 1054 or the accelerator 1056 may communicate with each of the first CPU 1010a, the second CPU 1010b, the GPU 1030, and the NPU 1040 through the CXL switch 1015, or may access the CXL memory 1050 and the CXL storage 1052.

In some embodiments, the CXL switch 1015 may be connected to an external network 1060 or a fabric, and may be configured to communicate with an external server through the external network 1060 or the fabric.

Figure 11:
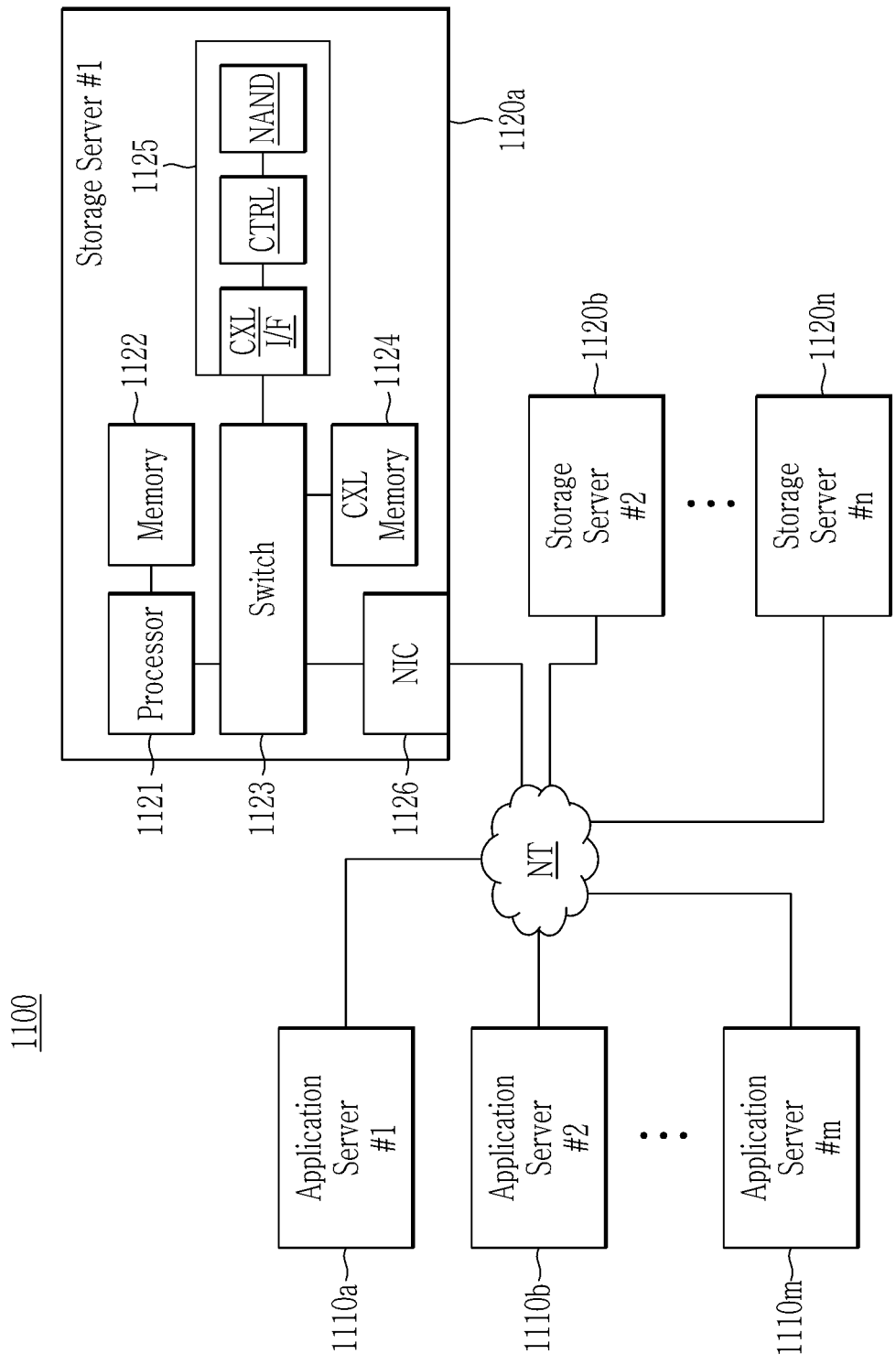
FIG. 11 illustrates a block diagram of a server system, according to an embodiment.

FIG. 11 illustrates a block diagram of a server system according to an embodiment.

Referring to FIG. 11, a data center 1100 is a facility that collects various data and provides a service, and may be referred to as a data storage center. The data center 1100 may be a system for operating a search engine and database, and may be a computer system used in a business or government institution such as, but not limited to, a bank. The data center 1100 may include application servers (1110a, . . . , 1110m, where m is an integer greater than 1, hereinafter "1110" generally) and storage servers (1120a, . . . , 1120n, where n is an integer greater than 1, hereinafter "1120" generally). The number of the application servers and the number of the storage servers may be variously selected according to embodiments, and the number of the application servers and the number of the storage servers may be different from each other.

Hereinafter, a configuration of a first storage server 1120a will be mainly described. Each of the application servers 1110 and each of the storage servers 1120 may have a structure similar to each other, and the application servers 1110 and the storage servers 1120 may communicate with each other through a network NT.

The first storage server 1120a may include a processor 1121, a memory 1122, a switch 1123, a storage 1125, a CXL memory 1124, and a NIC 1126. The processor 1121 may control overall operations of the first storage server 1120a, and may access the memory 1122 to execute an instruction loaded in the memory 1122 or process data. The processor 1121 and the memory 1122 may be directly connected, and the number of processor 1121 and the number of memory 1122 included in a storage server 1120 may be variously selected.

In some embodiments, the processor 1121 and the memory 1122 may provide a processor-memory pair. In some embodiments, the number of the processors 1121 and the number of the memories 1122 may be different. The processor 1121 may include a single-core processor and/or a multi-core processor. The above description of the storage server 1120 may be similarly applied to each of the application servers 1110.

The switch 1123 may be configured to mediate or route communication between various constituent elements included in the first storage server 1120a. In some embodiments, the switch 1123 may be a CXL switch as described in FIGS. 2 and 10, and the like. That is, the switch 1123 may be a switch implemented based on the CXL protocol.

The CXL memory 1124 and the storage device 1125 may be the CXL devices described with reference to FIG. 1 to FIG. 10.

The CXL memory 1124 may be connected to the switch 1123. The storage device 1125 may include a CXL interface circuit (CXL_IF), a controller (CTRL), and a NAND flash (NAND). The storage device 1125 may store data and/or output stored data according to a request of the processor 1121.

In some embodiments, the application servers 1110 may not include the storage 1125.

The NIC 1126 may be connected to the CXL switch 1123. The NIC 1126 may communicate with other storage servers 1120 or other application servers 1110 through the network NT.

In some embodiments, the NIC 1126 may include a network interface card, a network adapter, and the like. The NIC 1126 may be connected to the network NT by a wired interface, a wireless interface, a Bluetooth interface, an optical interface, and the like. The NIC 1126 may include an internal memory, a digital signal processor (DSP), a host bus interface, and the like, and may be connected to the processor 1121 and/or the switch 1123 through the host bus interface. In some embodiments, the NIC 1126 may be integrated with at least one of the processor 1121, the switch 1123, and the storage device 1125.

In some embodiments, the network NT may be implemented by using a fiber channel (FC), Ethernet, or the like. In this case, the FC may refer to a medium used for relatively high-speed data transmission, and may use an optical switch that provides high performance/high availability. Depending on an access method of the network NT, the storage servers may be provided as a file storage, a block storage, or an object storage.

In some embodiments, the network NT may be a storage-only network, such as, but not limited to, a storage area network (SAN). For example, the SAN may be an FC-SAN that uses an FC network and is implemented according to FC protocol (FCP). As another example, the SAN may be an IP-SAN network that uses a TCP/IP network and is implemented according to an iSCSI (SCSI over TCP/IP or Internet SCSI) protocol. In some embodiments, the network NT may be a general network such as, but not limited to, a TCP/IP network. For example, the network NT may be implemented according to a protocol such as, but not limited to, FC over Ethernet (FCoE), Network Attached Storage (NAS), and NVMe over Fabrics (NVMe-oF).

In some embodiments, at least one of the application servers 1110 may store data requested to be stored by a user or a client in one of the storage servers 1120 through the network NT. At least one of the application servers 1110 may obtain data requested to be read by a user or a client from one of the storage servers 1120 through the network NT. For example, at least one of the application servers 1110 may be implemented as a web server or a database management system (DBMS).

In some embodiments, at least one of the application servers 1110 may access a memory, a CXL memory, or a storage device included in another application server 1110 through the network NT, or may access memories, CXL memories, or storage devices included in the storage servers 1120 through the network NT. Accordingly, at least one of the application servers 1110 may perform various operations on data stored in other application servers and/or storage servers. For example, at least one of the application servers 1110 may execute an instruction to move or copy data between other application servers and/or storage servers. In this case, the data may be moved from the storage devices of the storage servers, through the memories or CXL memories of the storage servers, or directly to the memory or CXL memory of the application servers. Data moving through the network may be encrypted for security or privacy.

In some embodiments, each constituent element or a combination of two or more constituent elements described with reference to FIG. 1 to FIG. 11 may be implemented as a digital circuit, a programmable or non-programmable logic device or array, an application specific integrated circuit (ASIC), or the like.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An apparatus, comprising:
a plurality of compute express link (CXL) devices comprising first CXL devices and second CXL devices different from the first CXL devices, wherein each CXL device of the plurality of CXL devices comprises a memory in which a portion of the memory is allocated as a cache buffer, wherein each cache buffer is initially allocated a different cache eviction policy based on a corresponding measured latency of that cache buffer, wherein each cache buffer of the first CXL devices is initially allocated a first cache eviction policy and each cache buffer of the second CXL devices is initially allocated a second cache eviction policy different from the first cache eviction policy, and wherein allocation of the different cache eviction policies to the first CXL devices is modified based on a calculated ratio of a first average hit ratio of the cache buffer of the first CXL devices to a second average hit ratio of the cache buffer of the second CXL devices being different from an initial allocation ratio; and
a switch configured to connect the plurality of CXL devices to each other.

2. The apparatus of claim 1, further comprising a host connected to the plurality of CXL devices through the switch and configured to modify the different cache eviction policies of the cache buffer of each CXL device of the plurality of CXL devices.

3. The apparatus of claim 2, wherein:
the first CXL devices comprise a first quantity of CXL devices,
the second CXL devices comprise a second quantity of CXL devices,
the different cache eviction policies comprise a first cache eviction policy allocated to the first CXL devices and a second cache eviction policy allocated to the second CXL devices, and
the host is further configured to allocate the second cache eviction policy to at least one of the first CXL devices, based on a first ratio of the second average hit ratio of the second CXL devices to the first average hit ratio of the first CXL devices exceeding a second ratio of the second quantity of CXL devices to the first quantity of CXL devices.

4. The apparatus of claim 3, wherein the host is further configured to:
compare the second ratio and the first ratio to obtain a comparison result; and
determine, based on the comparison result, a third quantity of the second CXL devices to which the second cache eviction policy is allocated.

5. The apparatus of claim 3, wherein the host is further configured to select the at least one of the first CXL devices to which the second cache eviction policy is allocated according to an order of a lowest cache hit ratio from among the first CXL devices.

6. The apparatus of claim 3, wherein:
the first cache eviction policy is a least frequently used (LFU) eviction policy, and
the second cache eviction policy is a least recently used (LRU) eviction policy.

7. The apparatus of claim 2, wherein the host is further configured to:
receive respective cache hit ratios of the plurality of CXL devices from a master CXL device of the plurality of CXL devices to; and
modify, according to the respective cache hit ratios, a cache eviction policy of the cache buffer of each CXL device of the plurality of CXL devices.

8. The apparatus of claim 7, wherein the host is further configured to respectively pre-allocate the different cache eviction policies to the plurality of CXL devices.

9. The apparatus of claim 7, wherein the host is further configured to:
allocate a first cache eviction policy to a first CXL device with a first latency; and
allocate a second cache eviction policy to a second CXL device with a second latency,
wherein the first latency exceeds the second latency.

10. The apparatus of claim 9, wherein the host is further configured to:
allocate the first cache eviction policy and the second cache eviction policy according to a ratio of an average cache hit ratio of second CXL devices of the plurality of CXL devices to which the second cache eviction policy is allocated to an average cache hit ratio of first CXL devices of the plurality of CXL devices to which the first cache eviction policy is allocated.

11. The apparatus of claim 7, wherein the host is further configured to:
    transmit an instruction to the plurality of CXL devices, and
    determine the latencies of the plurality of CXL devices based on respective times when a response corresponding to the instruction is received from each CXL device of the plurality of CXL devices.

12. The apparatus of claim 2, wherein the cache buffer further comprises a plurality of cache buffer areas allocated to the host and the plurality of CXL devices.

13. The apparatus of claim 12, wherein a corresponding one of the different cache eviction policies is allocated to each cache buffer area of the plurality of cache buffer areas.

14. The apparatus of claim 1, wherein the plurality of CXL devices comprises a master CXL device configured to modify a cache eviction policy of the cache buffer of the plurality of CXL devices.

15. A server, comprising:
    a plurality of first devices comprising a cache buffer that comprises a plurality of areas; and
    a second device configured to:
        initially allocate, based on a corresponding measured latency, a corresponding cache eviction policy from among a plurality of cache eviction policies to each of one or more first areas allocated among the plurality of areas of the plurality of first devices; and
        modify allocation of the corresponding cache eviction policy allocated to each of the one or more first areas based on a calculated ratio of a first average cache hit ratio of the cache buffer of the plurality of first devices to a second average cache hit ratio of one or more second areas of the plurality of areas different from the one or more first areas being different from an initial allocation ratio.

16. The server of claim 15, wherein the second device is further configured to allocate the corresponding cache eviction policy to each of the one or more first areas, according to a latency of the plurality of first devices.

17. The server of claim 15, wherein
    the plurality of first devices comprises a third device and a fourth device,
    the plurality of cache eviction policies comprise a first cache eviction policy allocated to a first area of the third device and a second cache eviction policy allocated to a second area of the fourth device, and
    the second device is further configured to allocate the second cache eviction policy to at least one of the plurality of first devices to which the first cache eviction policy is allocated, based on a first ratio of a second cache hit ratio of the fourth device to a first cache hit ratio of the third device exceeding a second ratio of a second number of first devices of the plurality of first devices to which the second cache eviction policy is allocated to a first number of first devices of the plurality of first devices to which the first cache eviction policy is allocated.

18. The server of claim 17, wherein the second device is further configured to select the at least one of the plurality of first devices according to an ascending order of a lowest cache hit ratio of the first area from among the plurality of first devices to which the first cache eviction policy is allocated.

19. A method performed by a computing system, comprising:
    determining latencies of a plurality of compute express link (CXL) devices;
    allocating a cache eviction policy of a plurality of cache eviction policies to each of the plurality of CXL devices, according to the latencies of the plurality of CXL devices, the plurality of cache eviction policies comprising a first cache eviction policy and a second cache eviction policy, the plurality of CXL devices comprising a first quantity of first CXL devices to which the first cache eviction policy has been allocated and a second quantity of second CXL devices to which the second cache eviction policy has been allocated;
    checking cache hit ratios of the plurality of CXL devices; and
    modifying allocation of the cache eviction policy of at least one of the plurality of CXL devices to at least one of the first cache eviction policy and the second cache eviction policy, based on a first ratio of an average cache hit ratio of the first CXL devices and an average cache hit ratio of the second CXL devices, and a second ratio of the first quantity of the first CXL devices and the second quantity of the second CXL devices.

* * * * *